(12) United States Patent
Mainville et al.

(10) Patent No.: US 11,009,050 B2
(45) Date of Patent: May 18, 2021

(54) HYBRID SURFACE FINISH FOR A HYDRAULIC LINEAR SEALING SYSTEM

(71) Applicant: INDUSTRIES MAILHOT INC., St-Jacques (CA)

(72) Inventors: Luc Mainville, Joliette (CA); Patrick Boilard, Rosemère (CA); Jean-Michel Éthier, Montreal (CA)

(73) Assignee: INDUSTRIES MAILHOT INC., St-Jacques (CA)

( * ) Notice: Subject to any disclaimer, the term of this patent is extended or adjusted under 35 U.S.C. 154(b) by 65 days.

(21) Appl. No.: 15/780,835

(22) PCT Filed: Dec. 13, 2016

(86) PCT No.: PCT/CA2016/051461
§ 371 (c)(1),
(2) Date: Jun. 1, 2018

(87) PCT Pub. No.: WO2017/100914
PCT Pub. Date: Jun. 22, 2017

(65) Prior Publication Data
US 2018/0363685 A1    Dec. 20, 2018

Related U.S. Application Data

(60) Provisional application No. 62/267,375, filed on Dec. 15, 2015.

(51) Int. Cl.
*F15B 15/14* (2006.01)
*B23K 26/00* (2014.01)
(Continued)

(52) U.S. Cl.
CPC ...... *F15B 15/1457* (2013.01); *B23K 26/0006* (2013.01); *B23K 26/352* (2015.10);
(Continued)

(58) Field of Classification Search
CPC .. F15B 15/1457; F16J 1/08; F16J 7/00; B23K 26/355; Y10T 428/249979; Y10T 428/249953
See application file for complete search history.

(56) References Cited

U.S. PATENT DOCUMENTS 8,356,550 B2 *   1/2013   Kim ........................... F16J 1/08
                                                                    92/159
2006/0117947 A1   6/2006   Tabata et al.
(Continued)

FOREIGN PATENT DOCUMENTS

| CN | 204419752 U | | 6/2015 |
| JP | 2006016982 A | * | 1/2006 |
| JP | 2006016982 A | | 1/2006 |

OTHER PUBLICATIONS

Translation of JP 2006-016982, Takao Suzuki, Jan. 19, 2006. (Year: 2006).*
(Continued)

*Primary Examiner* — Hai Vo
(74) *Attorney, Agent, or Firm* — Lavery, De Billy, LLP; Gwendoline Bruneau

(57) ABSTRACT

A hydraulic rod in reciprocating movement within a barrel of a hydraulic cylinder along a longitudinal direction of the barrel, and a method of manufacturing thereof, a surface finish of the rod comprising valleys, wherein the rod further comprises microporosities on its surface, the microporosities having a depth at least equal to a depth of the valleys.

9 Claims, 2 Drawing Sheets

(51) Int. Cl.
  *B23K 26/352*    (2014.01)
  *F16J 1/08*    (2006.01)
  *F16J 1/00*    (2006.01)
  *F16J 7/00*    (2006.01)
  *F16N 1/00*    (2006.01)
  *B23K 101/34*    (2006.01)
  *B23K 103/10*    (2006.01)
  *B23K 103/04*    (2006.01)
  *B23K 101/04*    (2006.01)

(52) U.S. Cl.
  CPC ............... *B23K 26/355* (2018.08); *F16J 1/00* (2013.01); *F16J 1/08* (2013.01); *F16J 7/00* (2013.01); *F16N 1/00* (2013.01); *B23K 2101/04* (2018.08); *B23K 2101/34* (2018.08); *B23K 2103/04* (2018.08); *B23K 2103/10* (2018.08); *Y10T 428/249953* (2015.04); *Y10T 428/249979* (2015.04)

(56) References Cited

U.S. PATENT DOCUMENTS

2008/0184878 A1*   8/2008   Chen .................. F16J 1/04
                     92/159
2016/0169151 A1*   6/2016   Kuniyasu .............. F02F 3/00
                     92/187

OTHER PUBLICATIONS

International Search Report, PCT/CA2016/051461, dated Mar. 9, 2017.
Björling M., et al., The Effect of DLC Coating Thickness on Elstohydrodynamic Friction, Tribol Lett (2014) 55:353-362.
Huang, Yuli, Elastohydrodynamic Model of Hydraulic Rod Seals with Various Rod Surfaces, A Ph.D. Dissertation Presented to the Academic Faculty by Yuly Huang in Partial Fulfillment of the Requirements for the Degree Doctor of Philosophy in Mechanical Engineering, Georgia Institute of Technology, Dec. 2014.
Björling, M. et al., The Influence of DLC Coating on EHL Friction Coefficient, SpringerLink, Tribology Letters, Aug. 2012, vol. 47, Issue 2, pp. 285-294.

* cited by examiner

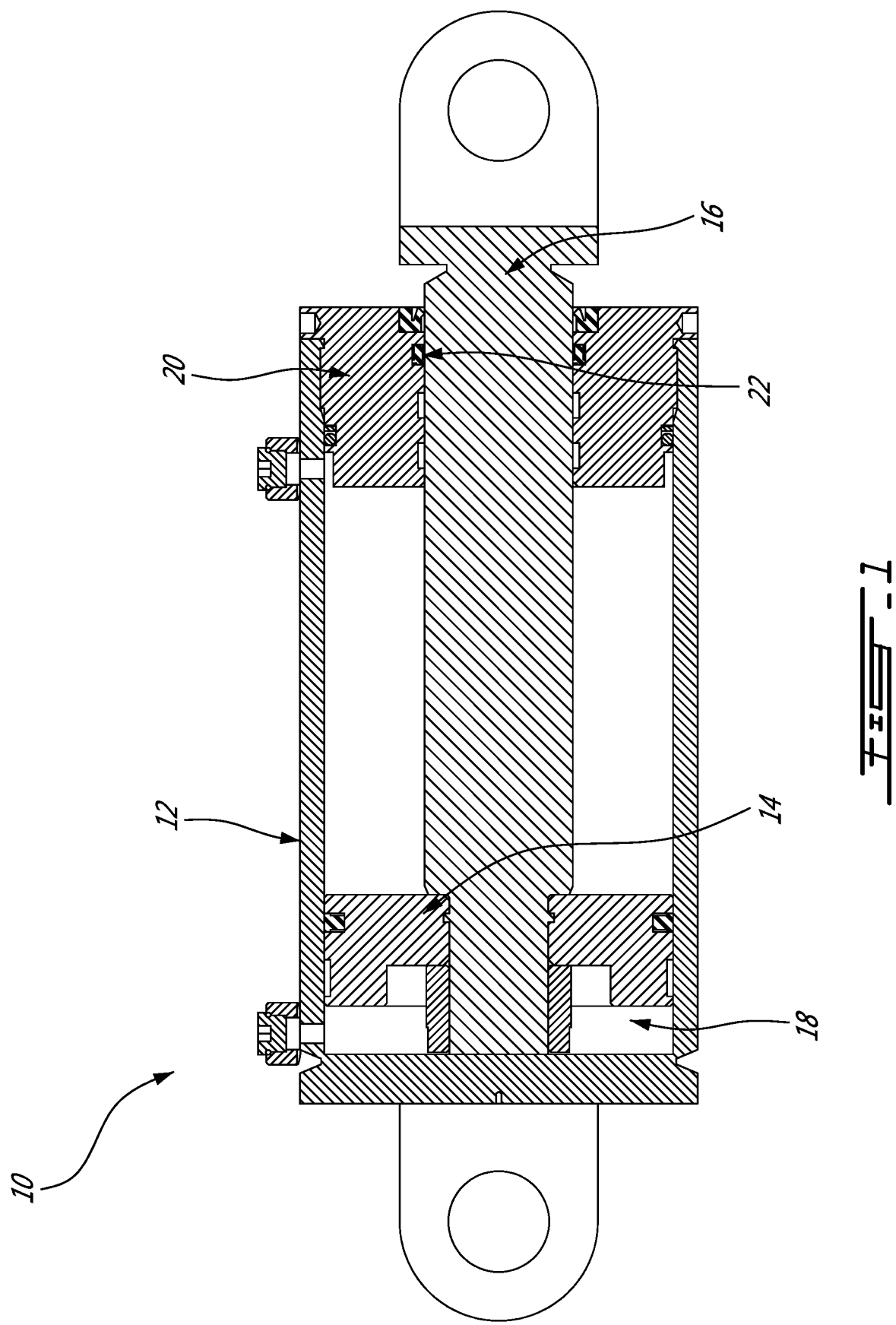

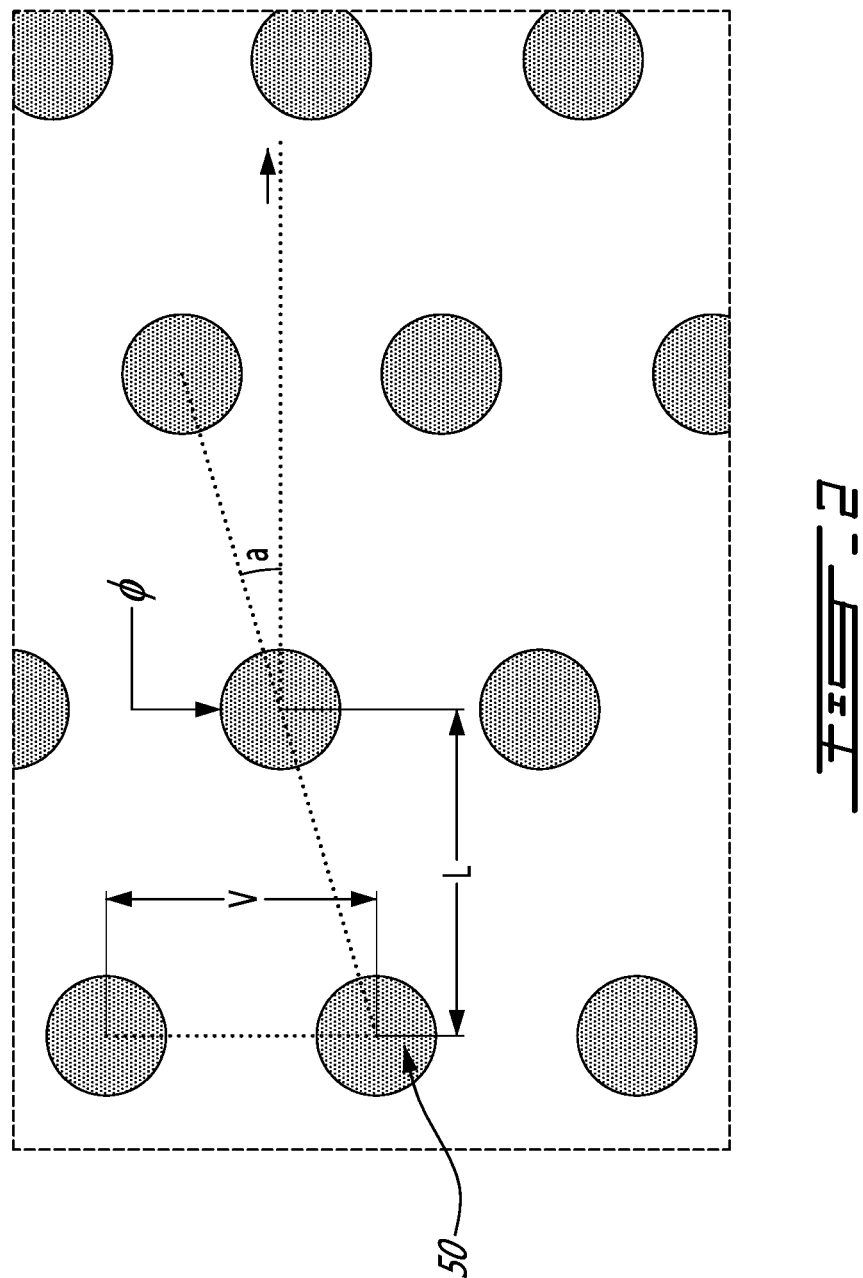

HYBRID SURFACE FINISH FOR A HYDRAULIC LINEAR SEALING SYSTEM

CROSS-REFERENCE TO RELATED APPLICATIONS

This application is a National Entry Application of PCT application no PCT/CA2016/051461 filed on Dec. 13, 2016 and published in English under PCT Article 21(2) as WO 2017/100914, which itself claims benefit of U.S. provisional application Ser. No. U.S. 62/267,375, filed on Dec. 15, 2015. All documents above are incorporated herein in their entirety by reference.

FIELD OF THE INVENTION

The present invention relates to components in reciprocal alternative linear movement, in hydraulic systems.

BACKGROUND OF THE INVENTION

Hydraulic components, such as hydraulic cylinders for example, comprise a number of moving parts in contact and seals, and friction is a key parameter of both their operational lifetime and of their energy consumption.

SUMMARY OF THE INVENTION

More specifically, in accordance with the present invention, there is provided a hydraulic rod in reciprocating movement within a barrel of a hydraulic cylinder along a longitudinal direction of the barrel, a surface finish of the rod comprising valleys, wherein the rod further comprises microporosities on a surface thereof, the microporosities having a depth at least equal to a depth of the valleys.

There is further provided a lubrication method for a first member in reciprocating movement relative to a second member, comprising forming a microtexturation on a surface finish of at least one of the first and second members, the surface finish comprising valleys, the microtexturation comprising microporosities having a depth at least equal to a depth of the valleys.

There is further provided a method of manufacturing a reciprocating rod of a cylinder, comprising forming a rod in a metal, providing a surface finish of the rod, and further machining microporosities on the surface of the rod, wherein the microporosities have a depth at least equal to a depth of valleys of the surface finish.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a partial longitudinal cross-sectional view of a cylinder; and

FIG. 2 shows a texturation pattern of a surface according to an embodiment of an aspect of the present invention.

DESCRIPTION OF EMBODIMENTS OF THE INVENTION

A hydraulic cylinder 10, as illustrated for example in FIG. 1, generally comprises a cylindrical barrel 12, inside of which a piston 14 connected to a reciprocating piston rod 16 moves back and forth along a longitudinal direction of the barrel 12. The barrel 12 is closed on a first side thereof by a cap 18 and at a second opposite side thereof by a cylinder head 20 where the piston rod 16 comes out of the barrel 12. The piston 14, which comprises sliding rings and seals, reciprocates in the pressure chamber thus formed by the barrel 12 and divides it into a cap end chamber and a head end chamber.

The barrel 12 is typically a tube made in steel. The cap 18 is at a first end of the pressure chamber. The cap 18 is connected to the body of the cylinder by welding, threading, bolts, or tie rod. A static seal or an o-ring may be used in between the cap 18 and the barrel 12.

The cylinder head 20 is at an opposite end of the pressure chamber. The head 20 is connected to the body of the cylinder by means of threading, bolts, or tie rod. A static seal or an o-ring is used between the head 20 and the barrel 12.

The piston 14 thus separates the pressure zones inside the barrel 12. The piston 14 is connected to the piston rod 16 by means of threads, bolts, or nuts to transfer the linear motion. The piston 14 is a metallic member, typically machined with grooves to fit elastomeric or metal seals and bearing elements.

The head 20 comprises seals to prevent pressurized oil from leaking past the interface between the rod 16 and the head 20, such as a fluid seal 22, typically in a thermoplastic polyurethane (TUI), such as MDI (diphenylmethane diisocyanate),TODI (diphenyldiisocyanate) and PPDI (p-phenylenediisocyanate) for example, or PTFE, Teflon™, for example.

The rod 16 attaches to the piston 14 and extends out of the cylinder 10 through the head end thereof. The rod 16 is a metallic member, typically in plated steel such as a hard chrome-plated piece of cold-rolled steel for example, or even in aluminum.

Typically, rings and guides are provided at the interface between the rod 16 and the head 20 and between the barrel 12 and the piston 14, in composite materials so as to reduce the coefficient of friction and the wear rate of the surfaces that are in a reciprocating movement. The coefficient of friction of such composite materials used is typically in the range between 0.19 and 0.11 so as to allow mechanical resistance.

The geometrical parameters of the surface finish of the rod 16, such as for example Rvk, which describes the lubricating capacity of the surface, and Rpk, which describes the abrasive behavior of the surface, have a direct impact on the wear rate of the fluid seals 22. In operation of the cylinder, the fluid seals 22 operate under hydraulic pressure and are heavily challenged, as they must ensure fluid tightness of the cylinder while submitted to friction with the rod 16.

According to an embodiment of an aspect of the present invention, the surface of the rod 16, after standard steps of surface finishing including sanding and polishing, is micro machined, for example laser-engineered using a laser for example, so as to create a microtexturation on its surface.

As shown for example in FIG. 2, the surface of the rod 16 is micro machined by forming shapes 50 on the surface finish of the rod 16, characterised by their geometry, diameter, depth, distribution and density on the surface of the rod. A surface density in a range between 5 and 20% may be achieved. The shape factor of the microtexturation may be selected depending on target properties of the surface of the rod. The round shape of the microporosities shown in FIG.

2 is illustrative only; the microporosities may have other shapes, such as oval, oblong, etc., with varying depth, diameter, length and width.

The shapes 50 on the surface finish of the rod are formed with a depth at least the depth of valleys originally present on the surface finish of the rod and as provided by sanding and polishing before the step of machining the microtexturation. Typically, the depths of such valleys as obtained by sanding and polishing before the step of machining the microtexturation is comprised in a range between 0.1 and 2 micrometers.

FIG. 2 shows thus shows for example a microtexturation comprising microporosities 50 of a diameter ∅ of about 20 micrometers. In this example, the rod has a diameter of 76 mm. The microporosities are shown separated by 50 micrometers (V and L in FIG. 2) one from the other, aligned along a direction perpendicular to the longitudinal direction of the rod, but offset along a longitudinal direction of the rod, i.e. the axial direction of the cylinder, by an angle α comprised in a range between 0 and 90 degrees, for example about 15 degrees relative to this longitudinal direction, for a surface density of about 20%. Each porosity 50 has a depth comprised in a range between 1 and 10 micrometers, for example of about 10 micrometers from the surface of the rod within the material of the rod.

It was found that the microtexture of the surface finish of the rod 16, i.e. such shapes 50, allows reducing the coefficient of friction between the fluid seal 22 and the rod 16. A cylinder comprising a rod with such a microtextured surface finish was found to have an increased lubrication capacity (Rvk), as the shapes 50 formed on the surface of the rod 16 by microtexturation are found to act as microporosities or pockets that trap lubricant, in addition to the valleys originally present on the surface finish of the rod. The microtextured surface allows a significant decrease, of up to 24%, of the friction coefficient in the contact between the fluid seal and the rod. In turn, such a decrease significantly impacts the lifetime of the fluid seals and of the hydraulic cylinder.

Moreover, the microtextured surface is shown to allow maintaining an adequate lubrication of the fluid seals as they reach their limit of wear and surface roughness: when the valleys originally present on the surface finish of the rod disappear due to wear out, the shapes 50 of the microtexture, being of a larger depth than these originally present valleys, take over, still trapping lubricant therein and thus maintaining lubrication of the fluid seals, thereby extending the useful lifetime of the components.

It was also found that the of the micro texture increases the lubricating capacity as measured by the material ratio Rmr as defined by the Abbott-Firestone bearing area curves.

The present method comprises selecting the parameters of the microtexturation so as to achieve a target form factor and density of microporosities in relation to an amount of lubricant to be trapped, and a target lubrication capacity. The microporosities pattern should not be aligned with the axis of the rod as such an alignment may create lubricant leakage points during the alternating movement of the rod (see FIG. 2).

The present invention was described hereinabove in relation the rod and seal of a hydraulic cylinder as components of hydraulic systems in alternating linear movement for illustrative purpose only. Microtexturation of the surface of a component could be applied to directional valves, or in hydraulic power steering systems, etc. for example.

The scope of the claims should not be limited by the embodiments set forth in the examples, but should be given the broadest interpretation consistent with the description as a whole.

What is claimed is:

1. A hydraulic cylinder comprising
a pressure chamber defined between a cap and a head, and internally being filled with a hydraulic fluid,
wherein a piston, a reciprocating rod and fluid seals are within the pressure chamber,
the piston connected to the reciprocating rod to transfer a linear motion moving back and forth along a longitudinal direction within said pressure chamber, the reciprocating rod extending out of the pressure chamber through the head,
the fluid seals provided at an interface between the rod and the head, wherein the pressure chamber, the piston and the rod are metallic members, the fluid seals are polymeric members,
wherein the reciprocating rod has a surface finish comprising valleys and microporosities, the valleys having a depth of from 0.1 to 2 µm, said microporosities having a depth of from 1 to 10 µm, provided that the depth of the microporosities is at least equal or greater than the depth of the valleys,
wherein the microporosities are separated one from the other by a distance along a direction perpendicular to a longitudinal direction of the rod, and offset one from the other along the longitudinal direction of the rod by an angle greater than about 0° to less than about 90°, the microporosities having a surface density of from 5 to 20%,
wherein the microporosities reduce a coefficient of friction between the fluid seals and the reciprocating rod of up to 24% while preventing the hydraulic fluid from leaking past the interface between the reciprocating rod and the head.

2. The hydraulic cylinder of claim 1, wherein the angle by which the microporosities are offset one from the other along the longitudinal direction of the reciprocating rod is of about 15°.

3. The hydraulic cylinder of claim 1, wherein the depth of the microporosities is about 10 µm.

4. The hydraulic cylinder of claim 1, wherein the microporosities have a round shape, an oval shape or an oblong shape.

5. A method of manufacturing a hydraulic cylinder comprising:
providing a pressure chamber defined between a cap and a head, and internally being filled with a hydraulic fluid, wherein a piston, a reciprocating rod and fluid seals are within the pressure chamber, the piston connected to the reciprocating rod to transfer a linear motion moving back and forth along a longitudinal direction within said pressure chamber, the reciprocating rod extending out of the pressure chamber through the head, fluid seals provided at an interface between the rod and the head, wherein the pressure chamber, the piston and the rod are metallic members, the fluid seals are polymeric members,
sanding and polishing to provide the reciprocating rod with a surface finish comprising valleys having a depth of from 0.1 to 2 µm,
microtexturing to form microporosities on the surface finish of the reciprocating rod wherein the microporosities ha.ve a depth of from 1 to 10 µm, wherein the depth of the microporosities is at least equal or greater than the depth of the valleys, wherein the microporosities are separated one from the other by a distance along a direction perpendicular to a longitudinal direction of the rod, and offset one from the other along the longitudinal direction of the rod by an angle greater than about 0° to less than about 90°, the microporosities having a surface density of from 5 to 20%, wherein the microporosities reduce a coefficient of friction between the fluid seals and the reciprocating rod of up to 24% while preventing the hydraulic fluid from leaking past the interface between the reciprocating rod and the head.

6. The method of claim 5, wherein the angle by which the microporosities are offset one from the other along the longitudinal direction of the reciprocating rod is of about 15°.

7. The method of claim 5, wherein the depth of the microporosities is about 10 μm.

8. The method of claim 5, wherein the microporosities have a round shape, an oval shape or an oblong shape.

9. The method of claim 5, wherein said step of microtexturing to form the microporosities on the surface finish of the reciprocating rod comprises using a laser.

\* \* \* \* \*